United States Patent [19]

Okuzono et al.

[11] Patent Number: 5,031,105
[45] Date of Patent: Jul. 9, 1991

[54] METHOD AND SYSTEM FOR WORKING BLADE MATERIAL FOR MOLD

[75] Inventors: Kazuyuki Okuzono; Takamasa Wakasugi, both of Numazu, Japan

[73] Assignee: Toshiba Kikai Kabushiki Kaisha, Tokyo, Japan

[21] Appl. No.: 337,068

[22] Filed: Apr. 12, 1989

[30] Foreign Application Priority Data

Apr. 13, 1988 [JP] Japan .................................. 63-90564

[51] Int. Cl.$^5$ ............................................ G06F 15/46
[52] U.S. Cl. ........................... 364/474.01; 364/474.11; 364/191
[58] Field of Search ................. 364/474.21, 474.34, 364/468, 474.11, 474.01, 474.33, 478, 473, 191; 29/568, 564; 414/491; 425/135, 142

[56] References Cited

U.S. PATENT DOCUMENTS

| | | | |
|---|---|---|---|
| 4,138,718 | 2/1979 | Toke et al. | 364/900 |
| 4,321,679 | 3/1982 | Fujie et al. | 364/474.34 |
| 4,473,883 | 9/1984 | Yoshida et al. | 364/474.21 |
| 4,550,375 | 10/1985 | Sato et al. | 364/474.17 |

*Primary Examiner*—Jerry Smith
*Assistant Examiner*—Paul Gordon
*Attorney, Agent, or Firm*—Stevens, Davis, Miller & Mosher

[57] ABSTRACT

In a system for working a blade material for a mold, the product size, material, etc. concerning individual blade materials to be worked is registered in a computer in advance, and a method of setting up the blade material to be worked is instructed to the operator by the computer. An NC working program is compiled automatically so that the operations of the machine are sequenced in such a manner that the working of all the blade materials on one pallet is completed most speedily after data on dimensions concerning the difference between the design values of the basic material obtained during the setup and measured values is input to the computer. The automatically compiled NC working program is collectively downloaded to an NC machine tool via a communication line. While the operator is setting up the basic material on one pallet, the blade material which has been set up on the other pallet is worked in accordance with the NC working program, thereby allowing the working of blade materials to be effected efficiently by the NC machine tool.

2 Claims, 4 Drawing Sheets

FIG.5A
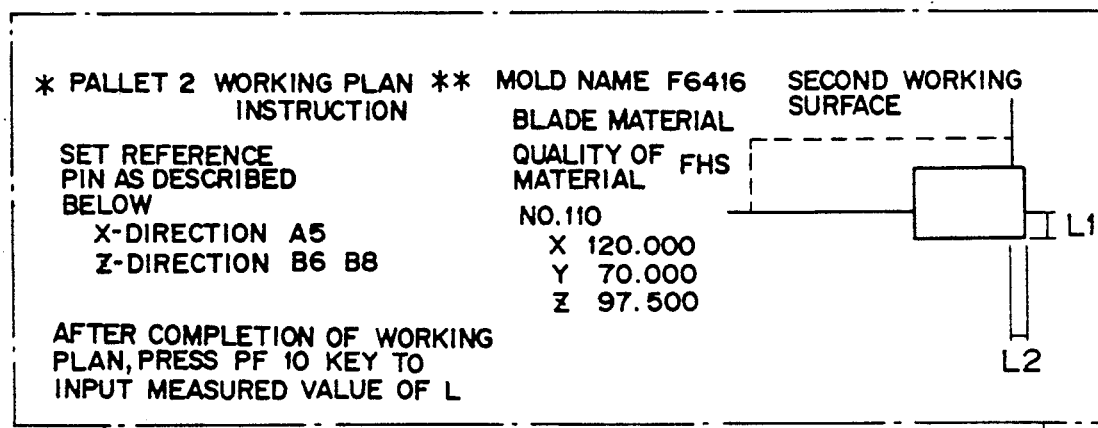
```
* PALLET 2 WORKING PLAN **    MOLD NAME F6416      SECOND WORKING
          INSTRUCTION          BLADE MATERIAL      SURFACE
   SET REFERENCE               QUALITY OF  FHS
   PIN AS DESCRIBED            MATERIAL
   BELOW                       NO. 110
      X-DIRECTION  A5             X  120.000
      Z-DIRECTION  B6 B8           Y   70.000
                                  Z   97.500
   AFTER COMPLETION OF WORKING
   PLAN, PRESS PF 10 KEY TO
   INPUT MEASURED VALUE OF L
```
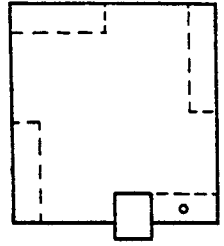
WORKING PLAN
EFECTING STATION
PROGRAM NO.
NO. 218
FIG.5B
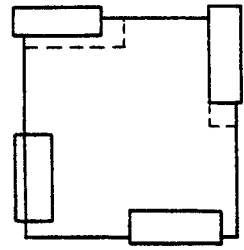
MACHINE TABLE
PROGRAM NO. S1127004
NO. 109   NO. 108
NO. 110
NO. 107
FIG.5C

METHOD AND SYSTEM FOR WORKING BLADE MATERIAL FOR MOLD

BACKGROUND OF THE INVENTION

The present invention relates to a method and a system for working a blade material for a mold using a numerical control (NC) machine tool.

The working of blade materials for molds has conventionally been carried out by certain manual operations. Specifically, the operator selects a material by referring to a drawing of a product to be worked and determines an appropriate setup and then an operator who is usually the same person subsequently performs rough working by operating a machine tool, finally finishing the workpiece to required product dimensions while measuring the relevant machining allowances.

In such conventional manual operations, one operator performs both the setup operation and the subsequent machine operations. Hence, it has been impossible to concurrently perform setup operations and machining. This not only causes the productivity of the overall system to suffer but also imposes a heavy burden on the operator. Furthermore, since the operator carries out the working of the workpiece to meet certain product dimensions by manually measuring the dimensions of the workpiece, there is a significant possibility of producing a product with dimensional errors due to erroneous measurements being made.

In addition, since a large variety of blade products with different dimensions are manufactured, the dimensions of the basic materials used as the blade materials for molds also vary. Accordingly, it is not suitable to work blade materials for molds by using an NC machine tool which must be operated after preparing an NC program in advance. Namely, since the steps of determining an appropriate setup for the working of blade materials for molds and of selecting the basic materials must be carried out by trained staff, there has been a problem in implementing this working process on a fully automatic basis by making use of an NC machine tool.

SUMMARY OF THE INVENTION

Accordingly, an object of the present invention is to provide a method and a system for working a blade material for a mold that permit a blade material for a mold to be worked efficiently without any need to interrupt the operation of a working system during the working of the blade material for a mold, thereby overcoming the above-described drawbacks of the conventional art.

Another object of the present invention is to provide a method and a system for working a blade material for a mold which, in cases where the dimensions of the basic materials used as blade materials for molds vary, permit an NC working program to be formulated automatically without any need for the operator to prepare a numerical control (NC) working program concerning individual blade materials.

To this end, in accordance with one aspect of the invention, there is provided in a system for working a blade material for a mold including a machining center for working a workpiece, a setup station for setting up the working of the workpiece, a numerical value controller connected in such a manner as to control the machining center, and a computer system for providing information and data concerning the workpiece to the numerical value controller, a first pallet placed on a machine table mounted on the machining center being replaceable with a second pallet supporting the workpiece placed on the setup station via a pallet changer, a method for working a blade material for a mold comprising the steps of: formulating information on tools to be used, data on machining conditions, data on individual blade materials, and data on a working schedule; registering various the data; instructing a setup for working the blade materials by the computer system in consecutively working the blade materials registered in accordance with the data on a working schedule; setting up the workpiece placed on the second pallet on the setup station, and inputting data on the dimensions of the set up workpiece; automatically formulating a numerical value control program on the basis of the registered data on information and the input data on dimensions; exchanging the second pallet for which setup has been completed and which is on standby for working with the first pallet for which working has been completed; and working the blade material by downloading the automatically compiled numerical value control program to the numerical value controller, wherein a cycle for implementing the various steps is repeated until the working of all the blade materials registered in the schedule is completed with respect to the pallet moved from the machine table side to the setup station side at the time of exchange of the pallets while the working of the blade materials is being carried out on the basis of the numerical value control program.

In accordance with another aspect of the invention, there is provided a system for working a blade material for a mold including a machining center for working a workpiece, a setup station for setting up the working of the workpiece, a numerical value controller connected in such a manner as to control the machining center, and a computer system for providing information and data concerning the workpiece to the numerical value controller, a first pallet placed on a machine table mounted on the machining center being replaceable with a second pallet supporting the workpiece placed on the setup station via a pallet changer, the system comprising: means for registering information on tools to be used, data on machining conditions, data on individual blade materials, and data on a working schedule; means for instructing a setup for working the blade materials by the computer system in consecutively working the blade materials registered in accordance with the data on a working schedule; means for setting up the workpiece placed on the second pallet on the setup station and for inputting data on the dimensions of the set up workpiece; means for automatically formulating a numerical value control program on the basis of the registered data on information and the input data on dimensions; means for downloading the automatically compiled numerical value control program to the numerical value controller so as to start the working of the replaced blade material; and means for repeating a cycle for implementing various the steps necessary for the working of blades until the working of all the blade materials registered in the schedule is completed with respect to the pallet moved from the machine table side to the setup station side at the time of exchange of the pallets while the working of the blade materials is being carried out on the basis of the numerical value control program.

In accordance with the present invention, data on individual blade materials to be worked (product size, material, etc.) is registered in a computer in advance, and a method of setting up the blade material to be worked is instructed to the operator by the computer. An NC working program is compiled automatically so that the operations of the machine are sequenced in such a manner that the working of all the blade materials on one pallet is completed most speedily after the operator inputs data on dimensions concerning the difference between the design values of the basic material obtained during the setup of the basic material and measured values. The automatically compiled NC working program is collectively downloaded to the NC machine tool via a communication line without being converted into a medium such as paper tape. While the operator is setting up the basic material on one pallet, the blade material which has been set up on the other pallet is worked in accordance with the NC working program, thereby allowing the working of blade materials to be effected efficiently by the NC machine tool.

In accordance with the present invention, therefore, it is possible to obtain the following advantages:

(1) Since it is possible, while the operator is performing a setup on one of the two pallets, for the blade material which has been set up on the other pallet to be worked simultaneously, the machining is substantially free from interruptions, thereby making it possible to improve productivity.

(2) All the operator has to do is to perform a setup supported on a color display, so the operator is relieved of the need to attend to all other operations.

(3) An NC working program is formulated automatically on the basis of information on tools and data on blade materials that are input in advance, as well as data on basic materials input by the operator at the time of setup. It is therefore unnecessary for the operator to formulate NC working programs for working blade materials even if the dimensions of blade products and of basic materials vary.

(4) It is possible for the operator to ascertain the state of progress during working by viewing pictures on a color display.

Preferred embodiments of the present invention will be described hereafter in detail with reference to the accompanying drawings.

BRIEF DESCRIPTION OF THE DRAWINGS

FIGS. 5A to 5C are diagrams illustrating pictures of a color display.

DESCRIPTION OF THE PREFERRED EMBODIMENTS

Figure 1:
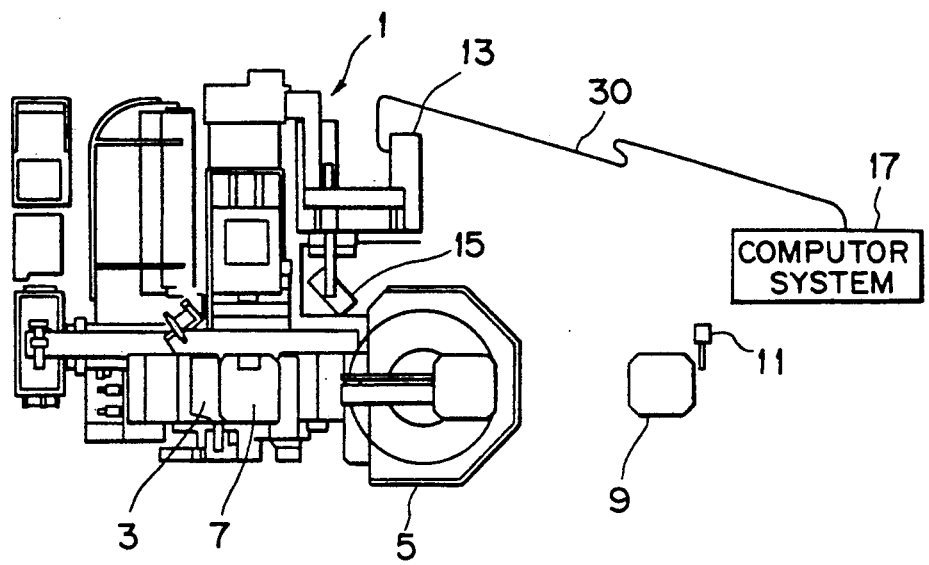
FIG. 1 is a schematic top plan view of an apparatus for implementing the working of a blade material for a mold in accordance with the present invention.

FIG. 1 is a schematic top plan view of an apparatus for implementing the working of a blade material for a mold in accordance with the present invention. A machining center 1 is provided with a main spindle for working a blade material for a mold. A machine table 3 is disposed at a position opposed to this main spindle, and a pallet 7 for setting a blade material to be worked is mounted on the machine table 3. A setup station 9 adapted to implement setups for working blade materials is provided in the proximity of the machining center 1. This setup station 9 is provided with a setup lamp 11 for informing the operator of completion of preparations following automatic compilation of an NC program prior to working. In addition, a pallet changer 5 is mounted on the machining center 1 and is adapted to change the pallet 7 placed on the table 3 in accordance with a given working procedure.

Control of the machining center 1 is effected by a numerical value controller 13, and reference numeral 15 denotes an operation panel thereof. In addition, the numerical value controller 13 is connected to a computer system 17 via a communication line.

Figure 2:
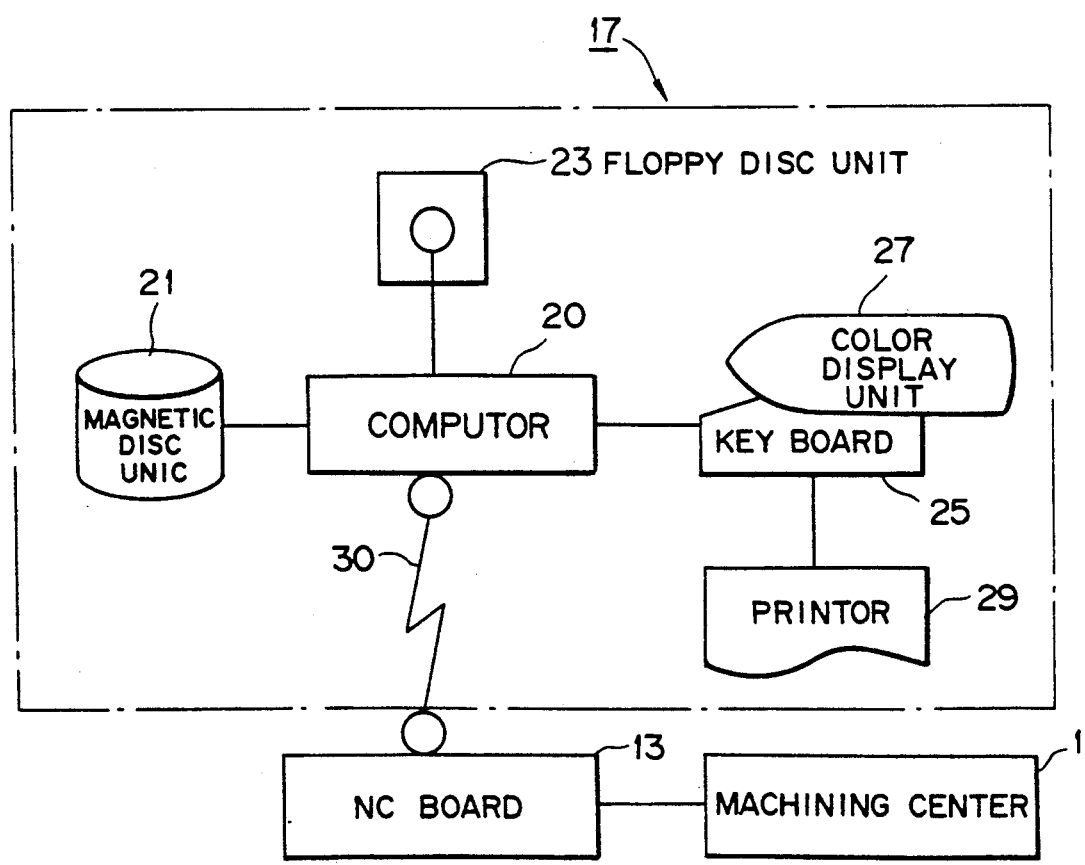
FIG. 2 is a block diagram of equipment adapted to implement information processing for the apparatus shown in FIG. 1.

FIG. 2 is a block diagram illustrating the interconnected relationships between the pieces of equipment related to information processing for the apparatus shown in FIG. 1. In FIG. 2, a magnetic disk unit 21 serving as a storage device, a floppy disk unit 23 serving as an input device, a keyboard 25, a color display 27 serving as an output device, and a printer 29 are operatively connected to a computer 20. In addition, the computer 20 is connected to the numerical value controller 13 via a communication line 30 to allow transmission and receipt of information, thereby controlling the operation of the machining center 1.

Figure 3:
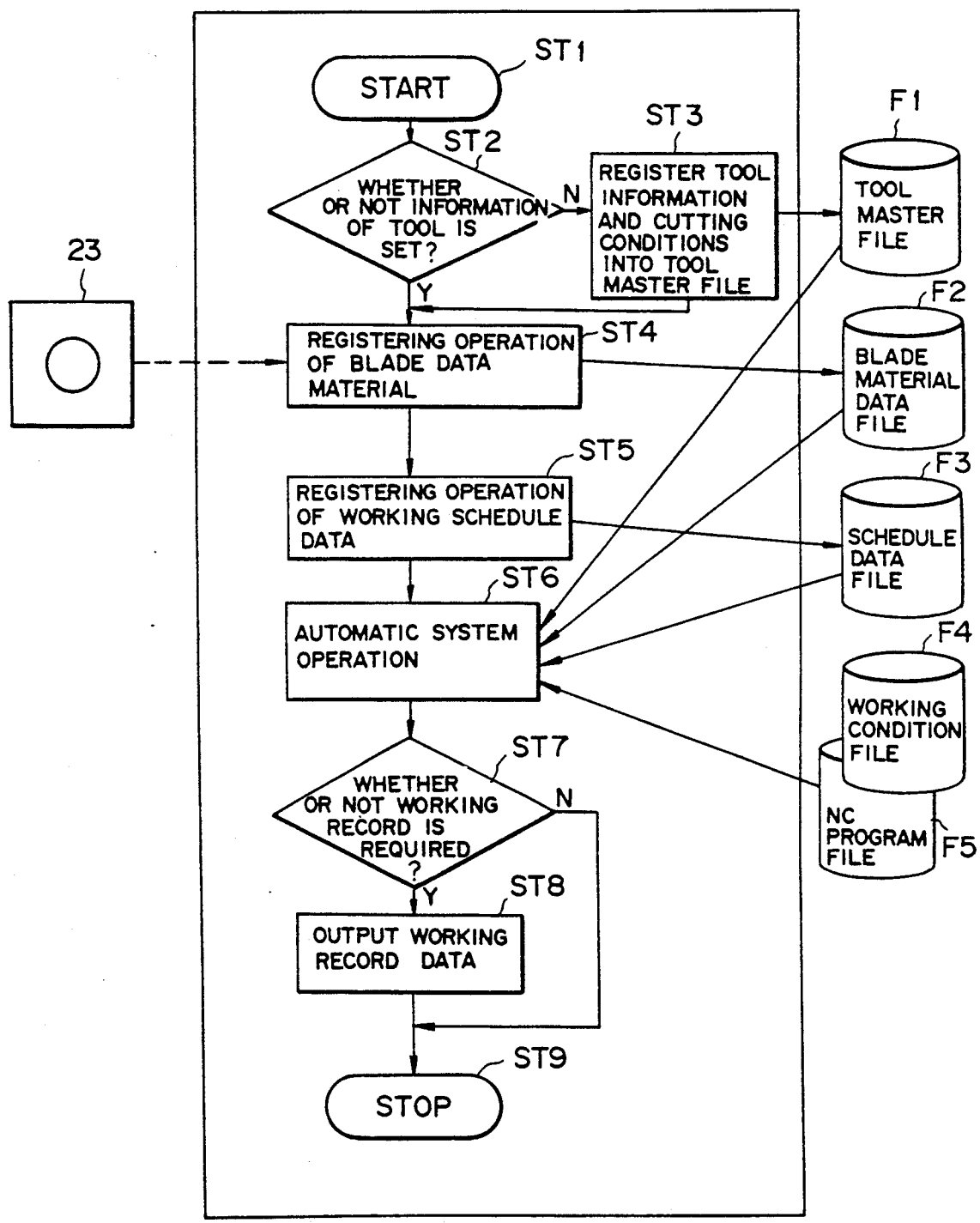
FIG. 3 is a flowchart illustrating the flow of processes in the working of a blade material for a mold.

FIG. 3 is a flowchart illustrating the processing flow for working a blade material for a mold. In FIG. 3, the system is started in step ST1. Upon starting the system, it is confirmed whether or not the relevant information concerning tools, such as tools to be used, cutting conditions, etc., has already been registered in a tool master file F1 (Step ST2). If it is determined in Step ST2 that the tool information has not been registered in the master file F1, a command is given to register tool information in the master file F1 (Step ST3). Subsequently, data concerning all the blade materials to be worked, which has been compiled by a host system and stored in, for instance, a floppy disk, is read out by the floppy disk unit 23 and is registered in a blade material data file F2 (Step ST4). In Step ST5, a working schedule concerning a blade material to be worked is registered in a data file F3. In addition, concurrently with the operation of the system, a working state file F4 and an NC program file F5 are prepared, and the operation of the system which will be described below is conducted automatically by referring to these files F1 to F5 (Step ST6). Upon completion of this operation of the system, a determination is made as to whether or not working results are required (Step ST7). If YES is the answer, working results are output in Step ST8, thereby completing the processing.

Figure 4:
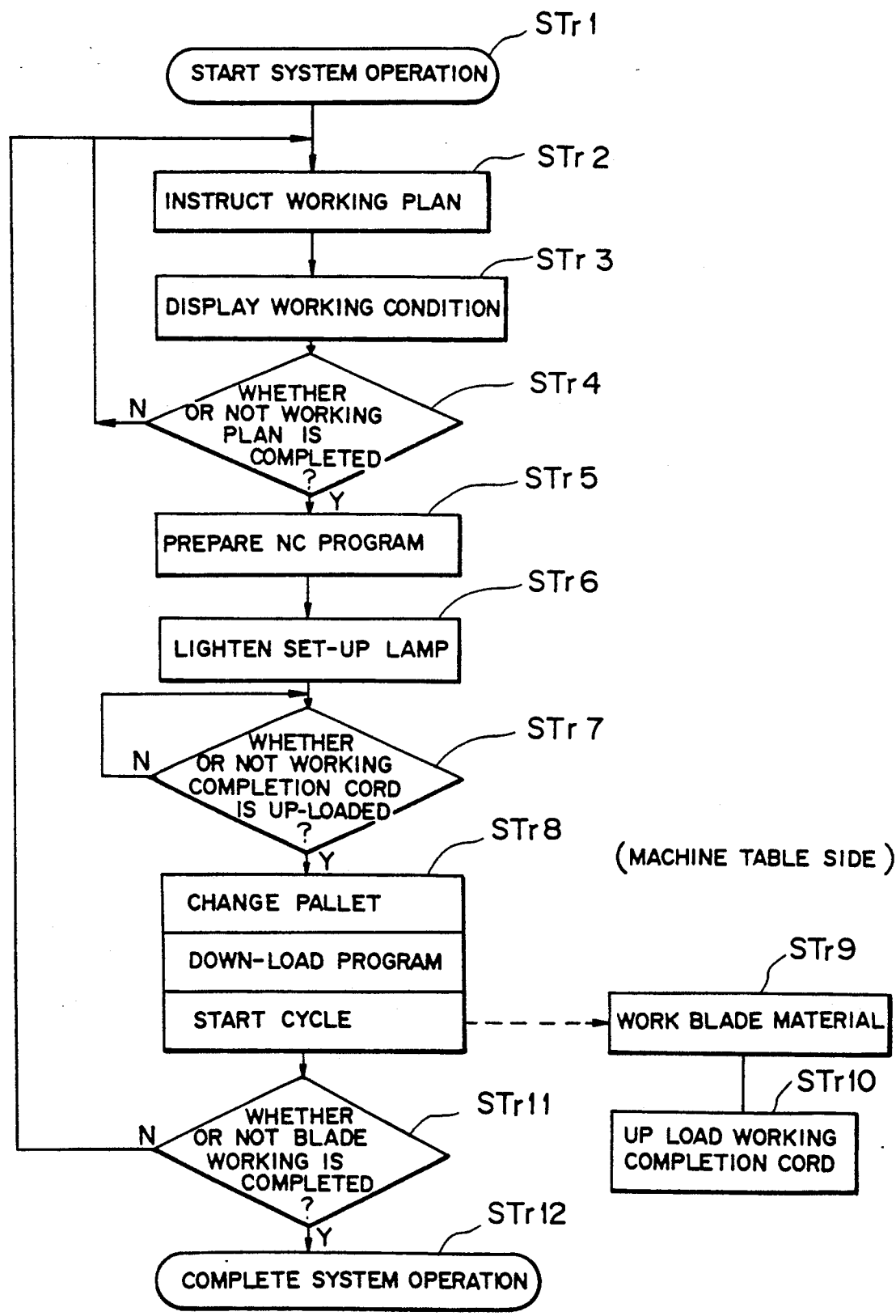
FIG. 4 is a flowchart illustrating in detail a processing for operating the system shown in FIG. 3.

FIG. 4 is a flowchart illustrating in detail Step ST6 for processing the aforementioned operation of the system.

In Step STr1, the operation of the system is commenced, and, in Step STr2, a blade material to be set up is instructed to the operator by the system by being displayed on the color display 27. On the basis of this instruction, the operator sets up the basic material suited to the instructed blade material on the pallet 9 provided on the setup station, and inputs dimensions L1 and L2 concerning the basic material through the keyboard 25.

The state of working of the blade material is indicated in Step STr3. In this Step STr3, whenever the system is being operated, the state of setup of the blade material on the pallet 9 of the setup station, such as the one shown in FIG. 5B, and the state of working of the blade material on the pallet 7 set on the machine table, such as the one shown in FIG. 5C, are displayed on a color display in different colors respectively corresponding to an unworked state, an in-process state, and a worked state. A determination as to whether or not the stepup of the blade material has been completed is made in Step STr4. If the setup has not been completed, the process returns to Step STr2, and if it has been completed, the process returns to an ensuing Step STr5. In Step STr5, an NC program is completed automatically on the basis of data on dimensions concerning basic materials input in advance as well as data on blade materials registered in advance in the blade material data file F2. Upon completion of Step Str5, the setup lamp 11 provided on the setup station is lit, thereby indicating that the preparations for working have been completed (Step STr6). The completion of working of the blade material is confirmed in Step STr7. In other words, in Step STr7, it is confirmed that the working of the blade material set on the machine table-side pallet has been completed, and a working completion code is uploaded from the numerical value controller 13 to the system. In Step STr8, the change of pallets, the downloading of the working program, and the working cycle are commenced. In other words, in Step STr8, the setup of the pallet of the setup station 9 is completed, the working of the blade material set on the machine table-side pallet 7 is completed, the pallet is changed by the pallet changer 5, the NC working program compiled automatically on the basis of an input mode is downloaded to the numerical value controller, and the working cycle and the setup cycle are commenced. Subsequently, the working of the blade material is carried out in response to the instruction given by the numerical value controller 11 (Step STr9). In addition, when the working of the blade material set on the pallet 7 in response to the instruction from the numerical value controller 13 is completed, the working completion code is uploaded to the system (Step STr10). Subsequently, it is confirmed whether the working of all the blade materials has been completed in accordance with the schedule (Step STr11). If NO is the answer, the process returns to Step STr2 to re-execute the respective steps, while if YES is the answer, the operation of the system is completed (Step STr12).

What is claimed is:

1. In a system for working a blade material for a mold including a machining center for working a workpiece, a setup station for setting up the working of the workpiece, a numerical value controller connected in such a manner as to control said machining center, and a computer system for providing information and data concerning the workpiece to said numerical value controller, a first pallet placed on a machine table mounted on said machining center being replaceable with a second pallet supporting the workpiece placed on said setup station via a pallet changer, a method for working a blade material for a mold comprising the steps of:

formulating information on tools to be used, data on machining conditions, data on individual blade materials, and date on a working schedule;

registering various said data;

instructing a setup for working the blade materials by said computer system in consecutively working the blade materials registered in accordance with said data on a working schedule;

setting up the workpiece placed on said second pallet on said setup station, and inputting data on the dimensions of the set up workpiece;

automatically formulating a machining program for each of said setup workpieces on the basis of the registered data on information and the input data on dimensions;

exchanging said second pallet for which setup has been completed and which is on standby for working with said first pallet for which working has been completed;

and working the blade material by downloading the automatically compiled numerical value control program to said numerical value controller;

wherein a cycle for implementing said various steps is repeated until the working of all the blade materials registered in said schedule is completed with respect to said pallet moved from said machine table side to said setup station side at the time of exchange of said pallets while the working of the blade materials is being carried out on the basis of said numerical value control program.

2. A system for working a blade material for a mold including a machining center for working a workpiece, a setup station for setting up the working of the workpiece, a numerical value controller connected in such a manner as to control said machining center, and a computer system for providing information and data concerning the workpiece to said numerical value controller, a first pallet placed on a machine table mounted on said machining center being replaceable with a second pallet supporting the workpiece placed on said setup station via a pallet changer, said system comprising:

means for registering information on tools to be used, data on machining conditions, data on individual blade materials, and data on a working schedule;

means for instructing a setup for working the blade materials by said computer system in consecutively working the blade materials registered in accordance with said data on a working schedule;

means for setting up the workpiece placed on said second pallet on said setup station and for inputting data on the dimensions of the set up workpiece;

means for automatically formulating a machining program for each of said setup workpieces on the basis of the registered data on information and the input data on dimensions;

means for downloading the automatically compiled numerical value control program to said numerical value controller so as to start the working of the replaced blade material; and means for repeating a cycle for implementing various said steps necessary for the working of blade until the working of all the blade materials registered in said schedule is completed with respect to said pallet moved from said machine table side to said setup station side at the time of exchange of said pallets while the working of the blade materials is being carried out on the basis of said numerical value control program.

* * * * *